No. 873,706.
PATENTED DEC. 17, 1907
A. F. BATCHELDER.
MOTOR TRUCK.
APPLICATION FILED MAY 15, 1906.
2 SHEETS—SHEET 2.
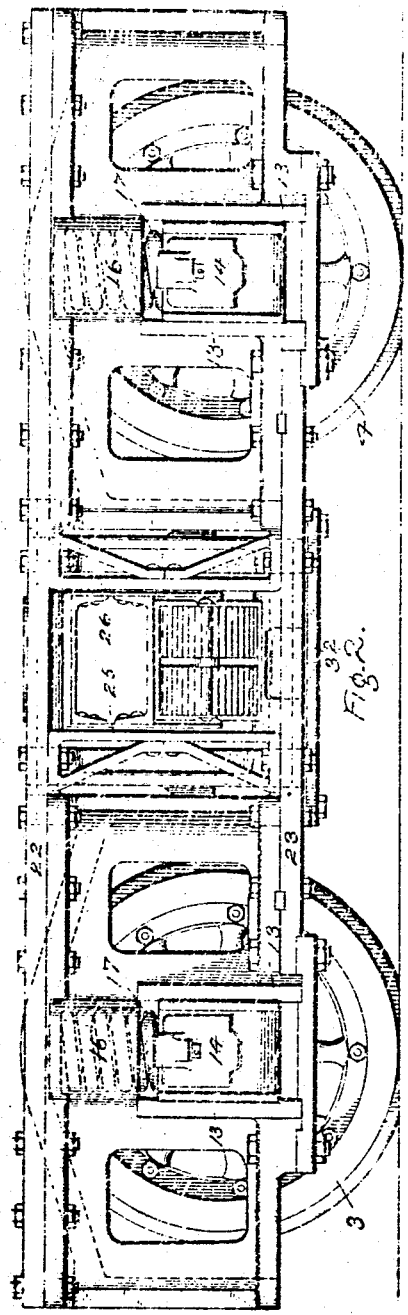
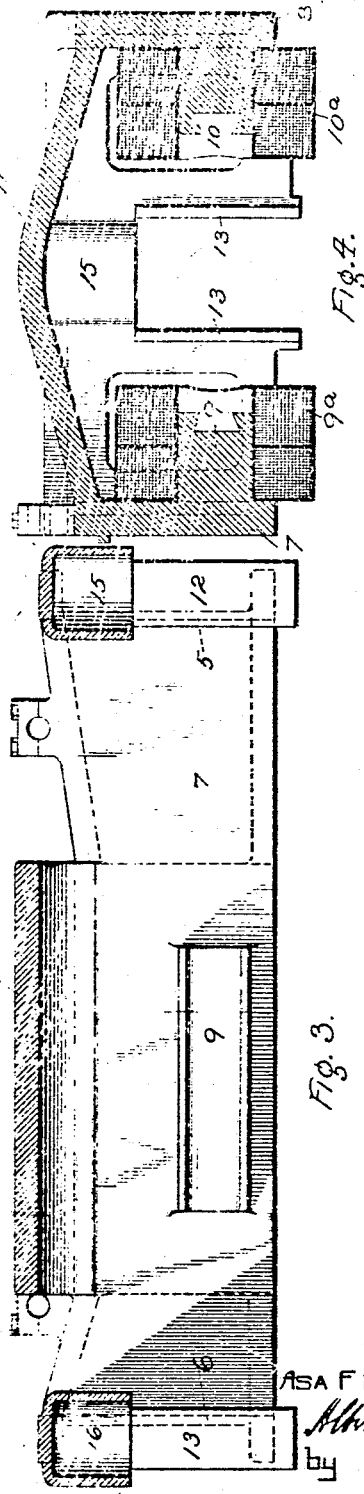
WITNESSES.
INVENTOR.
Asa F Batchelder.
by
Atty.

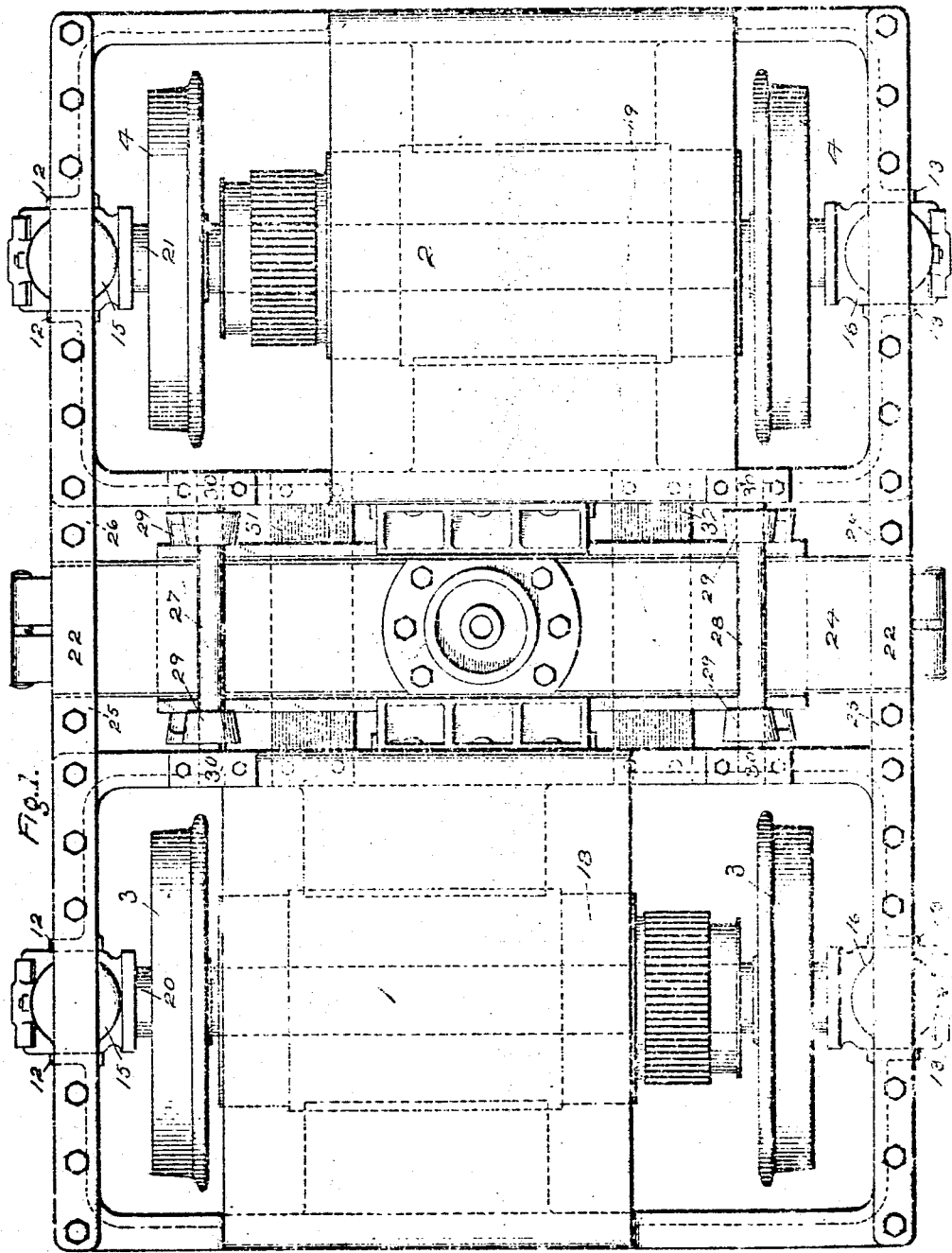

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

MOTOR-TRUCK.

No. 873,706.     Specification of Letters Patent.     Patented Dec. 17, 1907.

Application filed May 28, 1906. Serial No. 319,115.

*To all whom it may concern:*

Be it known that I, ASA F. BATCHELDER, a citizen of the United States, residing at Schenectady, county of Schenectady, State of New York, have invented certain new and useful Improvements in Motor-Trucks, of which the following is a specification.

The present invention relates to trucks and particularly to trucks for electrically propelled cars.

It has heretofore been customary to adapt trucks for electric service by re-arranging them somewhat as to form, in order to provide room for motors which have been introduced into the trucks as complete units entirely independent of the truck structure. Such arrangements, while satisfactory for ordinary street railway service, of course impose limitations which prevent the obtaining of the best results as to simplicity, durability and efficiency of the apparatus as a whole where the trucks are to be used for heavy service such as auxiliary local traffic on steam roads.

The object of the present invention is to provide a motor truck wherein the electrical and mechanical features of the entire truck coöperate to produce a truck which is simple in construction, durable, and of maximum electrical and mechanical capacity.

In one of its aspects the present invention may be considered as comprising a truck made up of a plurality of electric motors tied together into one unit and provided with wheels on the armature shafts, the armature shafts being the axles of the truck.

The present invention will be more fully understood and its objects and advantages will be made more clearly apparent from the following detailed description taken in connection with the accompanying drawing, wherein:

Figure 1 is a plan view of a truck embodying the present invention in a preferred form; Fig. 2 is a side view of the same; and Figs. 3 and 4 are, respectively, longitudinal and transverse sections of one of the motor frames.

Referring to the drawings which illustrate a four-wheel truck, 1 and 2 are a pair of motors for operating the drivers 3, 3, and 4, 4, respectively. The motors are preferably of the bi-polar type. The frame of each motor is made so as to form half of the truck-frame in addition to providing the magnetic circuit for the motor. Each of these frames is therefore preferably made in the form of a rectangle having deep end walls 5 and 6 and deep side walls 7 and 8, the length of the motor frames being equal to the width of the truck. The pole pieces 9 and 10 project inwardly from the side members 7 and 8, and a yoke 11 of a width equal to the width of the pole-pieces and exciting coils 9ª and 10ª connects the members 7 and 8 together at their upper edges. In the members 5 and 6 of the motor frame are located jaws 12 and 13, respectively, arranged to receive axle-boxes 14. Above these jaws are arranged sockets 15 and 16, respectively, which are adapted to receive coil springs 17; these springs in turn resting upon the axle-boxes. The axle-boxes are slidingly fitted to the jaws in the usual way, so that the motor frames are yieldingly supported upon the axle-boxes for movements up and down within prescribed limits.

The pole faces of the motors are preferably arranged as shown in Patent No. 808,717, granted on Jan. 2, 1906, on an application filed by me, in order that the pole pieces may move transversely of the armatures. The motor armatures 18 and 19 are mounted directly upon the axles 20 and 21, respectively, and these axles are journaled in the axle-boxes 14; the drivers 3, 3, and 4, 4, being preferably mounted upon the axles between the boxes and the motor armatures. These motor units are tied together by means of top and bottom bars 22 and 23 respectively; the bars being secured to flanges on the end members of the motor frames which now constitute side portions of the truck frame. The bars 22 preferably extend the entire length of the truck, while the bars 23 may terminate at the jaws for receiving the axle-boxes. The motor frames are secured in such positions with respect to each other that space is left between the adjacent side members of the motor frames for a bolster 24 which may be of the form usually employed for heavy trucks. The adjacent sides of the motor frames may or may not be used as transoms, but I prefer to provide separate transom members 25 and 26, as illustrated, since thereby the construction of the motor frame is simplified and they may be made symmetrical and cast in a single piece. The bolster 24 is hung from rods 27 and 28 journaled in bearings 29 on the transom members and bearings 30 on the motor frames. Bracing pieces 31 and 32 may be secured to the lower edges of the motor frames beneath the bolster, in position to bridge the space between the frames, thereby further increasing the stiffness of the structure. If it is not desired to use a swing bolster it is evident that this bolster may be omitted and the truck arranged in a well-known manner to directly support the car body.

By making each motor frame of a single casting a very stiff construction which is not apt to be distorted under lateral stresses is secured, but it will of course be understood that the motor frames may be made up of more than one piece if desired.

It will be seen that by constructing and arranging the motor frames so as to form the major portion of the mechanical frame of the truck, each part is made to serve its own functions as a truck element or as a motor element, as the case may be, while coöperating with the remaining parts to form a whole which is of simple and durable construction and wherein the maximum efficiency which can be obtained within the prescribed limits of space are secured, namely, the truck is mechanically strengthened at the same time that the power and efficiency of the motors is increased.

Although I have described in detail a preferred form of my invention, I do not desire to be limited to the details of construction shown and described, since, in its broader aspects, the invention may take various other forms.

What I claim as new and desire to secure by Letters Patent of the United States, is—

1. An electric truck comprising a plurality of motor field magnet frames having lengths approximately equal to the width of the truck, means for rigidly connecting said frames together, journal boxes supported in said frames, motor armatures arranged on shafts journaled in said bearings, and traction wheels on said shafts.

2. An electric truck comprising a pair of motor field magnet frames having lengths approximately equal to the width of the truck, means for rigidly connecting said frames together, a swing bolster supported between said frames, bearings carried by said frames, motor armatures arranged on shafts journaled in said bearings, and traction wheels on said shafts.

3. In an electric truck, a plurality of field magnet frames having lengths equal to the width of the truck, means for rigidly connecting said frames together, jaws in opposite ends of said frames, journal boxes seated in said jaws, motor armatures arranged in operative relation to said field frames and having their shafts seated in bearings in said journal boxes, and traction wheels on said shafts.

4. In an electric truck, a plurality of field magnet frames, means for rigidly connecting said frames together, jaws in opposite ends of said frames, journal boxes slidingly mounted in said jaws, springs between the journal boxes and frames, axles mounted in bearings in said journal boxes, traction wheels on said axles, and armatures mounted on said axles in operative relation to the field magnet frames.

5. An electric truck comprising a plurality of rectangular metal frames rigidly connected together to form a truck frame, pole pieces on said frames, motor armatures supported in operative relation to said pole pieces and having their shafts journaled in said frames, and traction wheels on said shafts.

6. An electric motor comprising a plurality of rectangular metal frames rigidly connected together to form a truck frame, journal boxes yieldingly mounted in said frames, axles having bearings in said journal boxes, motor armatures mounted on said axles in operative relation to said pole pieces, and traction wheels on said axles.

7. An electric truck comprising a plurality of rectangular metal frames rigidly connected together and each having jaws at opposite ends and spring sockets above the jaws, journal boxes seated in said jaws, springs in said sockets resting upon said journal boxes, axles having bearings in said journal boxes, pole pieces on said frames, motor armatures mounted on said axles in operative relation to said pole pieces, and traction wheels on said axles.

8. An electric truck comprising a plurality of rectangular metal frames rigidly connected together and each having jaws at opposite ends and spring sockets above the jaws, journal boxes seated in said jaws, springs in said sockets resting upon said journal boxes, axles mounted in said journal boxes, pole pieces on said frames, motor armatures mounted on said axles in operative relation to the pole-pieces, and traction wheels rigidly secured to said axles between the journal boxes and the motor armatures.

9. An electric truck comprising a plurality of rectangular metal frames rigidly connected together, each of said frames having pole pieces on opposite sides and a yoke located above said pole pieces and connecting said sides together, motor armatures arranged in operative relation to said pole pieces and having their shafts journaled in said frames, and traction wheels on said shafts.

10. In an electric truck, a plurality of rectangular metal frames, each frame having inwardly-projecting pole pieces on its sides and jaws in its ends, means for rigidly connecting said frames together to form a truck frame, journal boxes slidingly mounted in said jaws, springs between said frames and said journal boxes, wheeled axles having bearings in said journal boxes, and motor armatures carried by said axles in operative relation to the pole pieces, said pole pieces being shaped to permit the armatures to move vertically with respect thereto.

11. A frame for an electric truck comprising a plurality of rectangular metal frames, each frame having jaws at opposite ends and inwardly-projecting pole pieces on its sides together with a yoke connecting said sides together above the pole pieces, and means for rigidly connecting said frames together.

12. A truck frame comprising a plurality of rectangular metal frames, each frame having jaws in its ends and pole pieces projecting inwardly from its sides, together with a yoke connecting said sides together above the pole-pieces, and top and bottom members rigidly connected to corresponding ends of said frames.

13. A truck frame comprising a pair of rectangular metal frames having jaws in the ends thereof and pole pieces projecting inwardly from the sides thereof, tie-bars rigidly connecting corresponding ends of said frames together, and transoms rigidly connected to said tie-bars between said frames.

14. In an electric truck, a plurality of integral rectangular metal frames each having jaws in its ends and pole-pieces projecting inwardly from its sides, together with a yoke connecting said sides together above the pole-pieces, tie-bars rigidly connecting corresponding ends of said frames together, journal boxes yieldingly mounted in said jaws, axles having bearings in said journal boxes, wheels on said axles, and motor armatures carried by said axles in operative relation to the pole-pieces.

In witness whereof, I have hereunto set my hand this 26th day of May, 1906.

ASA F. BATCHELDER.

Witnesses:
HELEN ORFORD,
G. C. HOLLISTER.